United States Patent
Cordery et al.

(10) Patent No.: US 8,208,633 B2
(45) Date of Patent: Jun. 26, 2012

(54) METHOD AND SYSTEM FOR SECURING COMMUNICATIONS IN A METERING DEVICE

(75) Inventors: Robert A. Cordery, Danbury, CT (US);
Frederick W. Ryan, Jr., Oxford, CT (US); Yassir Nawaz, Hamden, CT (US)

(73) Assignee: Pitney Bowes Inc., Stamford, CT (US)

( * ) Notice: Subject to any disclaimer, the term of this patent is extended or adjusted under 35 U.S.C. 154(b) by 657 days.

(21) Appl. No.: 12/276,523

(22) Filed: Nov. 24, 2008

(65) Prior Publication Data

US 2010/0128872 A1 May 27, 2010

(51) Int. Cl.
*H04L 9/00* (2006.01)
(52) U.S. Cl. ........ 380/265; 380/262; 380/263; 173/170; 173/171; 173/172; 173/173
(58) Field of Classification Search ............... 380/1–287
See application file for complete search history.

(56) References Cited

U.S. PATENT DOCUMENTS

| | | | |
|---|---|---|---|
| 5,293,465 A | | 3/1994 | Abumehdi et al. |
| 6,035,290 A | * | 3/2000 | Pintsov ...................... 705/405 |
| 6,064,989 A | * | 5/2000 | Cordery et al. ................ 705/50 |
| 6,178,412 B1 | * | 1/2001 | Ratzenberger et al. ....... 705/408 |
| 7,039,185 B2 | * | 5/2006 | Campagna et al. ............. 380/43 |
| 2004/0131182 A1 | * | 7/2004 | Rogaway ........................ 380/37 |

OTHER PUBLICATIONS

Schneier Applied Cryptography Second Edition : protocols, algorithms, and source code in C 1996; Published by John Wiley & Sons.*
Kaufman Internet Key Exchange (IKEv2) Protocol Dec. 2005.*

* cited by examiner

*Primary Examiner* — Longbit Chai
(74) *Attorney, Agent, or Firm* — Brian A. Lemm; Charles R. Malandra, Jr.; Steven J. Shapiro (57) ABSTRACT

A method and system for securing the communication link between the accounting device and printer of a metering system by authenticating the data being sent via the link utilizing a Nonlinear Feedback Shift Register (NLFSR) based system is provided. A NLFSR is provided in each of the accounting unit and printing unit of a metering system. The NLFSR in the accounting unit is utilized to generate a message authentication code (MAC) for the image data being sent from the accounting unit to the printing unit. The printing unit generates a corresponding MAC for the received image data using the NLFSR in the printing unit. The MAC generated by the printing unit is compared with the MAC generated by the accounting unit. If the MACs are similar, the image data is accepted as authentic and the printing unit will print the image corresponding to the image data.

18 Claims, 4 Drawing Sheets

METHOD AND SYSTEM FOR SECURING COMMUNICATIONS IN A METERING DEVICE

FIELD OF THE INVENTION

The invention disclosed herein relates generally to systems for evidencing postage payment, and more particularly to a method and system for securing the communications between an accounting device and a printer in a metering system.

BACKGROUND OF THE INVENTION

Metering systems, such as, for example, postage metering systems, have been developed which employ cryptographically secured information that is printed on a mailpiece as part of an indicium evidencing postage payment. The indicium includes a postage value for the mail piece, along with other postal data that relates to the mailpiece and the postage meter printing the indicium. The indicium includes cryptographically secured information that authenticates and protects the integrity of information, including the postage value, imprinted on the mailpiece for later verification of postage payment. Since the indicium incorporates cryptographically secured information relating to the evidencing of postage payment, altering the printed information in an indicium is detectable by standard verification procedures.

Presently, postage metering systems are recognized as either closed or open system devices. In a closed system device, the printer functionality is solely dedicated to metering activity. Examples of closed system metering devices include conventional digital and analog postage meters wherein a dedicated printer is securely coupled to a metering or accounting function device. In conventional closed system mechanical and electronic postage meters, a secure link is required between printing and accounting functions such that printing will not occur without accounting for the postage value being dispensed. For older postage meters configured with printing and accounting functions performed in a single, secure box, the integrity of the secure box is monitored by periodic inspections of the meters. More recently, digital printing postage meters, which typically include a digital printer coupled to a postal security device (PSD), have removed the need for physical inspection by cryptographically securing the link between the accounting and printing mechanisms. In essence, new digital printing postage meters create a secure point-to-point communication link between the PSD and print head. This link must be protected to deter an attacker from fraudulently driving the print head and printing indicia for which payment has not actually been accounted for by the PSD. Typically, there are three main attacks that must be protected against: (i) an attacker disconnecting the PSD and directly driving the print head, (ii) an attacker recording the data communicated to the print head by the PSD and replaying the data to the same or another printer at a later time, and (iii) an attacker recording data communicated to the print head from the PSD and replaying it simultaneously to another print head, also known as parallel printing.

One known technique for protecting the link between the PSD and print head entails cryptographically securing the data utilizing a Linear Feedback Shift Register (LFSR) based stream encryption, such as described in U.S. Pat. Nos. 5,293,465 and 7,039,185. In systems such as described in the aforementioned patents, the output data from the accounting unit (which typically consists of image data for an indicium generated by the PSD) is encrypted by logically combining the image data with a pseudo-random pattern generated by a LFSR. The print head includes a similar LFSR that generates an identical pseudo-random pattern, which is utilized to decrypt the image data from the accounting unit and enable printing. While such systems generally work well, there are some drawbacks. For example, since the image data on the link appears in encrypted form, troubleshooting of the link is very difficult to perform in the event of a malfunction. In addition, such systems provide a very low level of security, as LFSRs have several known weaknesses. An attacker, by observing the encrypted data and printed image, can recover the secret state of the LFSRs without major effort. This enables an attacker to construct counterfeit images that appear valid and can be fed directly to the print head. Furthermore, should the LFSRs in the accounting unit and print head become unsynchronized because of an error or malfunction, the print head and accounting unit have no way of knowing that they are out of synchronization with each other. The PSD in the accounting unit will continue to generate indicia and send the encrypted image data to the print head. The print head will continue to decrypt the image data, but because the LFSRs are not synchronized, such decryption will not result in the original image data being recovered. The print head will still print the indicia images that are not properly decrypted, and therefore useless. The printing of the image, even though not properly decrypted, will still result in the accounting for the postage funds to occur. Such operation of printing useless images while still accounting for the postage funds will continue until either the postage meter is stopped manually or a new session is initiated between the PSD and print head to allow them to synchronize with each other. This results in wasted paper, ink and postage funds.

SUMMARY OF THE INVENTION

The present invention alleviates the problems associated with the prior art and provides a method and system for securing communications between the accounting device and printer of a metering system that does not suffer from the drawbacks of using a LFSR based encryption scheme.

In accordance with the present invention, the communication link between the accounting device and printer of a metering system is secured by authenticating the data being sent via the link utilizing a Nonlinear Feedback Shift Register (NLFSR) based system. A NLFSR is provided in each of the accounting unit and printing unit of a metering system. Each of the NLFSRs are initialized with identical secret states. The NLFSR in the accounting unit is utilized to generate a message authentication code (MAC) for the image data being sent from the accounting unit to the printing unit. The image data is sent, without having to be encrypted, along with the MAC, from the accounting unit to the printing unit. The printing unit, upon receipt of the image data and the MAC, generates a corresponding MAC for the received image data using the NLFSR in the printing unit. The MAC generated by the printing unit is compared with the MAC generated by the accounting unit. If the MACs are similar, the image data is accepted as authentic and the printing unit will print the image corresponding to the image data. If the MACs are not similar, the printing unit will not accept the image data as authentic, resulting in the image data being discarded and not printed. By using the NLFSR based system to secure the communication link between the accounting unit and the printing unit, the communications are secured through authentication instead of encryption, and therefore the image data is sent in its original form, making troubleshooting of the link much easier. Furthermore, the NLFSRs provide a much higher level of security than the LFSRs, as it is very difficult to ascertain the secret state of the NLFSR simply by observing the data and printed images. In addition, by stopping the printing unit from printing any image data that is not authenticated, there is no waste of paper, ink or postage funds.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
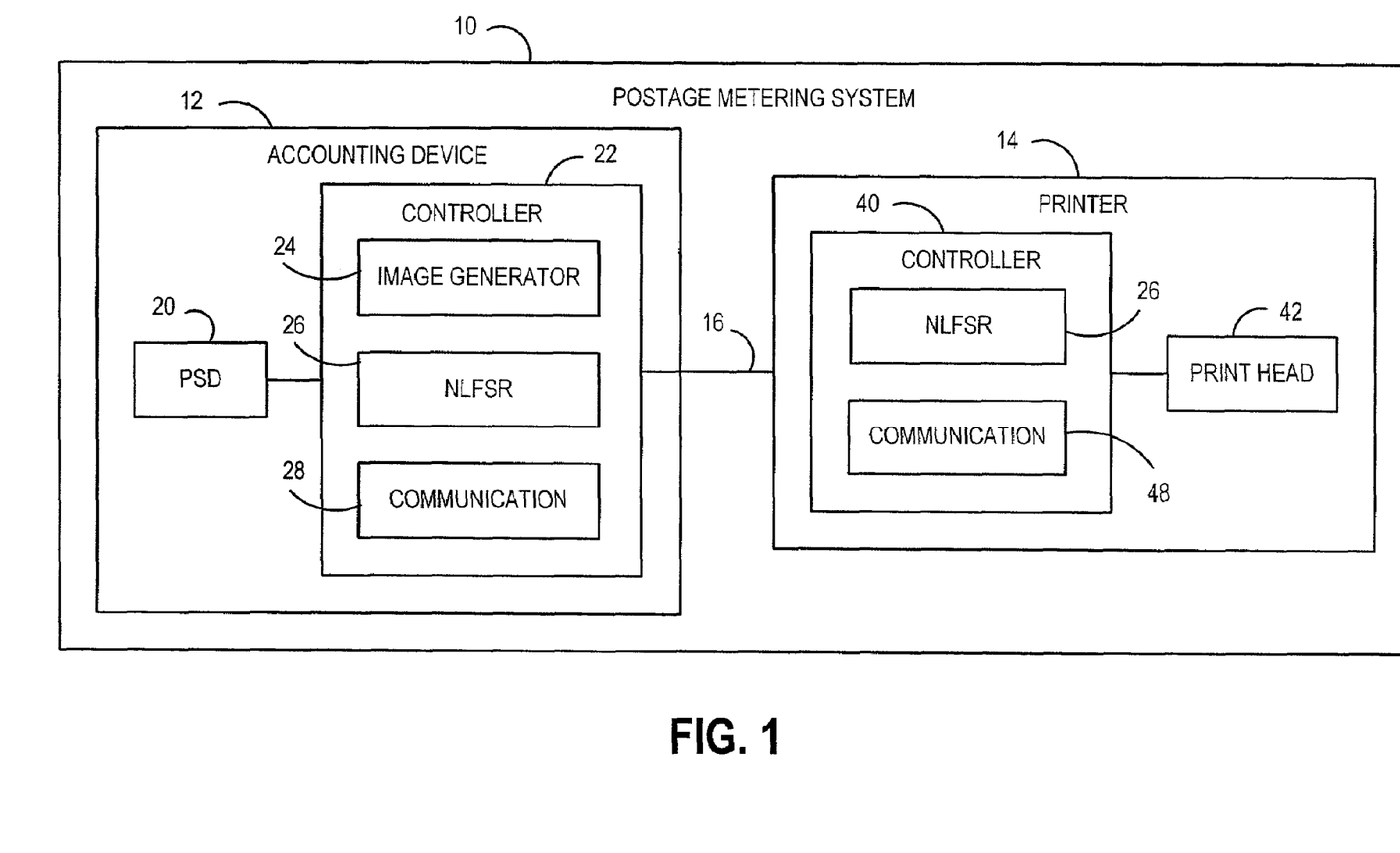
FIG. 1 illustrates in block diagram form a postage metering system according to the present invention.

In describing the present invention, reference is made to the drawings, wherein there is seen in FIG. 1 a metering system 10 according to the present invention. Meter system 10 includes an accounting device 12 coupled to a printer 14 via a communication link 16, such as, for example, a cable, wireless connection, or the like. Accounting device 12 includes a postal security device (PSD) 20 used to generate the data required for an indicium for a mail piece. Accounting device further includes a controller 22, which is preferably implemented as any type of general or special purpose microprocessor or the like. Preferably, the controller 22 is located within a secure boundary to prevent tampering with the functioning of the controller 22. Indicium data generated by the PSD 20 is provided to an image generator 24 of the controller 22, which uses the indicium data to generate an image of the indicium or instructions required to generate an image of the indicium, hereinafter referred to as image data. The image generation is preferably implemented as software within the controller 22. The image data is provided to a NLFSR 26 for generation of a message authentication code (MAC) associated with the image data as will be described further below. The NLFSR 26 can be implemented as any type of software, hardware, or a combination of the two. The image data and MAC are then provided to a communication unit 28 of the controller 26, and the image data and MAC sent to printer 14 via cable 16.

Printer 14 includes a controller 40 coupled to a printhead 42. Controller 40 is preferably implemented as any type of general or special purpose microprocessor or the like. Preferably, the controller 40 is located within a secure boundary to prevent tampering with the functioning of the controller 40. Print head 42 may be any type of print head, such as, for example, an ink-jet print head, or the like that is suitable for printing images on a medium, such as a mail piece. The controller 40 includes a communication unit 48 which receives the image data and the MAC from the accounting device 12. The image data is provided to a NLFSR 26 of the printer 14 for generation of a comparison MAC. As will be described further below, based on the correspondence of the comparison MAC with the MAC received from the accounting device 12, the controller 40 will either accept the image data and drive the print head 42 based on the image data to print the corresponding image, or discard the image data and not print.

Figure 2:
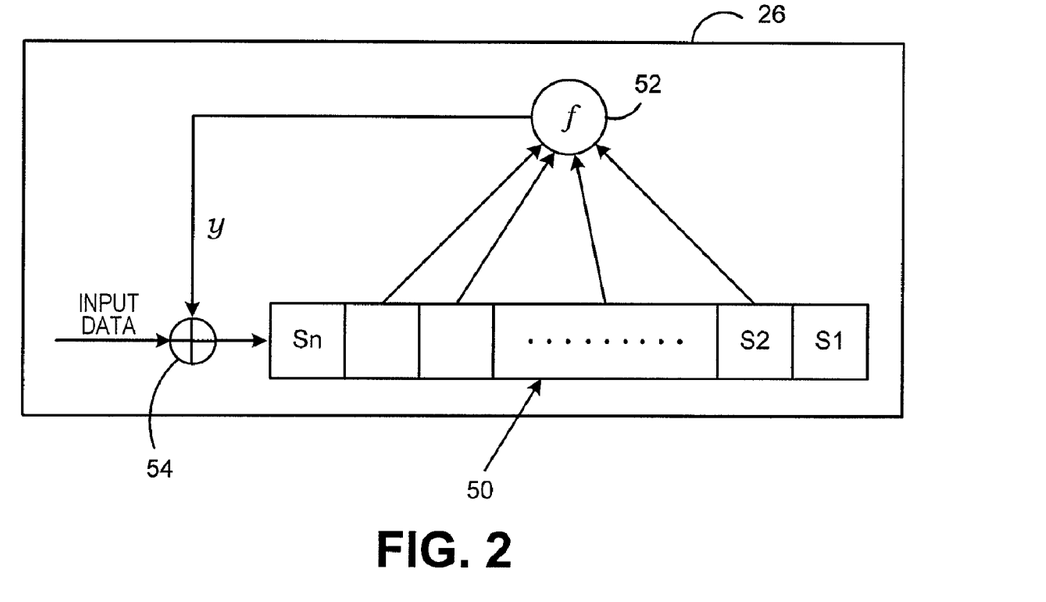
FIG. 2 illustrates in schematic diagram form the structure of an exemplary NLFSR according to the present invention.

FIG. 2 illustrates in schematic diagram form the structure of the NLFSR 26 according to the present invention. As noted above, the NLFSR 26 could be implemented as either software, hardware or combination thereof. The NLFSR 26 consists of n stages 50 designated as $S_1, S_2, \ldots S_n$ with a feedback function 52, designated f in FIG. 2. Parameter n can be selected according to the desired level of security (the larger n is, the greater the security) within processing ability and time constraints, and feedback function 52 is preferably any nonlinear function. The output y from the feedback function 52 is input to an exclusive-or (XOR) function 54 along with the input data (described further below) and the output value from the XOR function 54 is input to the stage $S_n$, with the existing value in each stage shifting by one stage and the existing value in stage $S_1$ being discarded. The resulting values stored in each stage are again input to the feedback function 52 for generation of a new output y, which is XORed with the next portion of input data.

Figure 3:
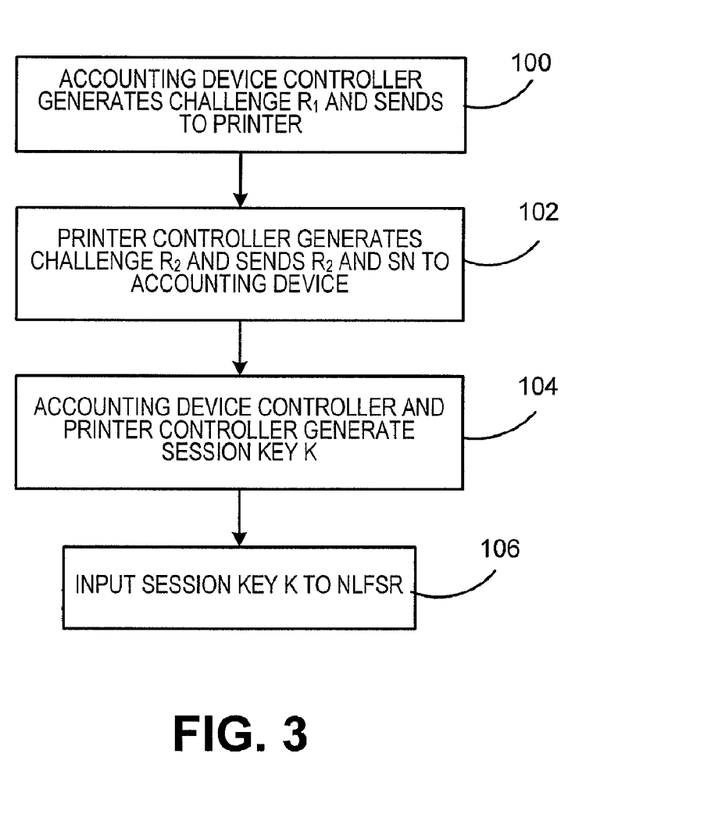
FIG. 3 illustrates in flow chart form a key agreement process that can be utilized according to the present invention.

The operation of the metering system 10 will be described with respect to the flow charts illustrated in FIGS. 3-5. In order for the system 10 to operate properly, it is necessary to ensure that NLFSR 26 of accounting device 12 and NLFSR 26 of printer 14 are set to the same initial state. This is accomplished by performing a key agreement process to derive a shared session key k which is used to establish the initial state between the accounting device 12 and printer 14. Preferably, this process is performed at suitable intervals, such as for example, once each day the postage metering system 10 is operating. It may also be performed each time the postage metering system 10 is powered up, and after a MAC verification fails (as described below).

During manufacturing of each print head 42, it is assigned a unique serial number SN. A master key, MK, is stored in the controller 22 of the accounting device 12 and the controller 40 of the printer 14 during manufacture. The master key MK may be updated after the postage metering system 10 has been deployed in the field, using for example, a network connection or the like. A preferred embodiment of a key agreement process according to the present invention operates as illustrated in FIG. 3. It should be noted, however, that any key agreement protocol could be used to agree upon a derived shared session key used to initialize the NLFSRs in the accounting unit 12 and printer 14. Referring now to FIG. 3, in step 100 the accounting unit controller 22 generates challenge data $r_1$ and sends it to the printer controller 40. The challenge data may be, for example, a 128 bit number generated by a counter, random or pseudo-random number generator. In step 102, the printer controller 40 generates its own challenge data $r_2$ and sends $r_2$ and its serial number, SN, to the accounting device controller 22. In step 104, both the accounting unit controller 22 and printer controller 40 compute the session key k based on the challenge data $r_1, r_2$, the serial number, SN, and the master key, MK, previously stored therein. For example, the session key k can be computed using the following formula:

$$k = [HMAC\text{-}SHA256_{MK}(r_1 \| SN \| r_2)]$$

where HMAC-SHA256 is a secure hash algorithm, such as, for example, described in the Internet Engineering Task Force standard RFC 4634, that utilizes the master key MK. The key k can be truncated using standard truncation, i.e., select only a defined portion of the most significant bits, least significant bits, etc., based on the size of the NLFSRs 26. For example, if the NLFSRs 26 have six stages with a feedback function f suitable for implementation on 32-bit processors, then each stage of the NLFSRs 26 would be a 32-bit word, and therefore the size of each NLFSR 26 is 192 bits. The session key k would therefore be truncated to 192 bits to match the size of the NLFSRs 26. In step 106, the session key k is input to the NLFSR 26 in each of the accounting device 12 and printer 14 to initialize the NLFSRs 26. Each stage of the NLFSRs 26 stores a portion of the session key k based on the size of the stages.

After a key agreement process has been performed and the NLFSR 26 in the accounting device 12 and printer 14 have been initialized, the controller 22 of the accounting device 12 uses the session key k to compute MACs for the image data it transmits to the printer 14 and the controller 40 of the printer 14 uses the session key k to verify the MACs received from the accounting device 12. The NLFSRs 26 can be used to compute and verify MACs for multiple images without having to be re-initialized (unless so desired as described above).

Figure 4:
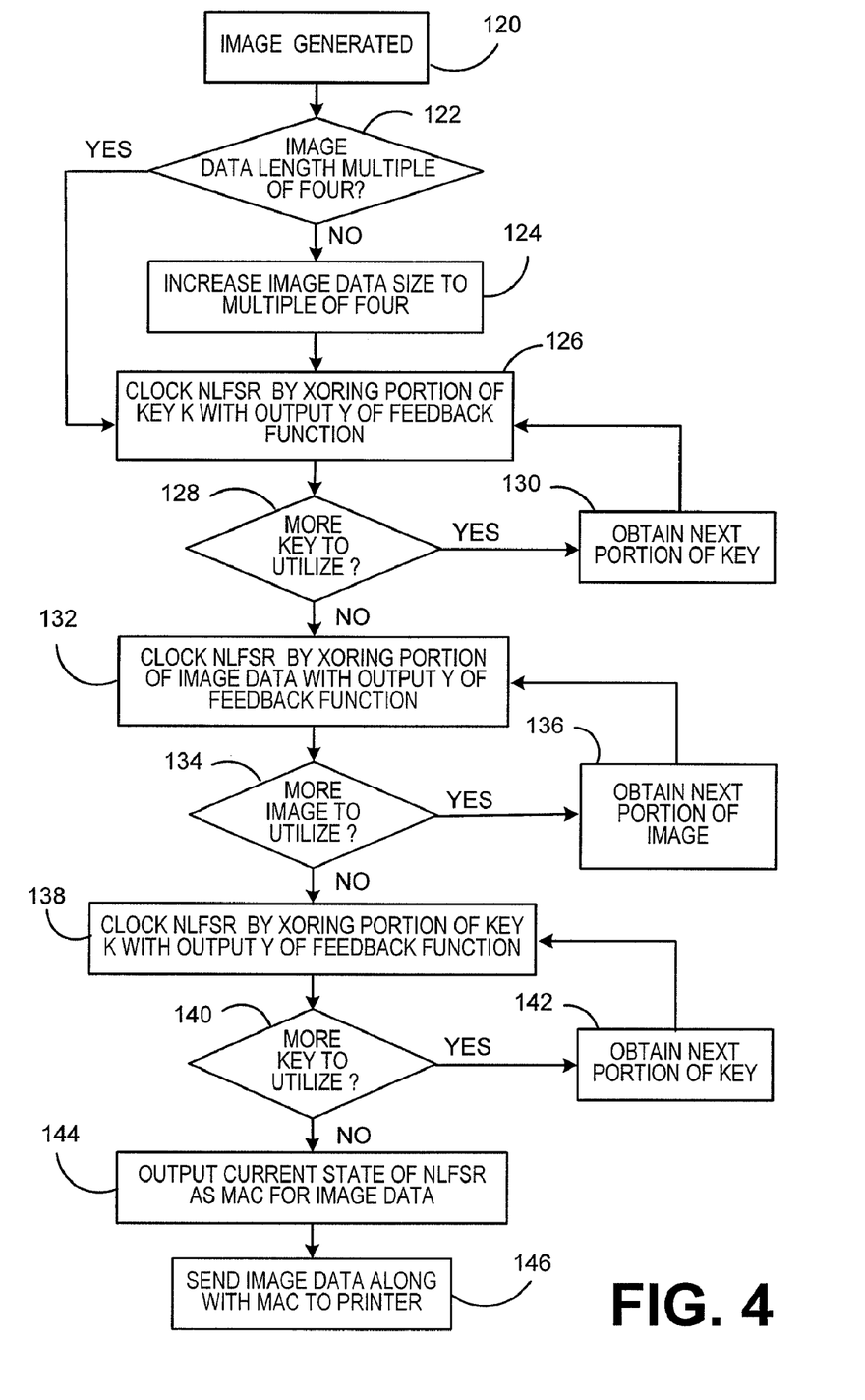
FIG. 4 illustrates in flow chart form a portion of the operation of the postage metering system of FIG. 1 according to an embodiment of the present invention.

An example of the processing performed by the controller 22 of the accounting device 12 to generate a MAC for an image is described with respect to FIG. 4. The description provided assumes a six stage NLFSR 26, and a feedback function f suitable for implementation on 32-bit processors defined as:

$$y = f(S) = (S[6] \ggg 13) + ((S[4] \ggg 18) \oplus S[2]) + (S[1] \ggg 7)$$

where $x \ggg j$ is the circular right shift of x by j bits;

$x_1 + x_2$ is the addition of $x_1$ and $x_2$ modulo $2^{32}$, and $x_1$ and $x_2$ are 32 bit-unsigned integers; and $x_1 \oplus x_2$ is the bitwise XOR of $x_1$ and $x_2$.

It should be understood, of course, that the present invention is not so limited to six stage NLFSRs or the feedback function as described, as these are exemplary in nature.

Referring now to FIG. 4 in conjunction with FIGS. 1 and 2, in step 120 an image m is generated by the image generator 24. The image could be, for example, an indicium that evidences payment of postage for a mail piece being processed by the postage metering system 10. The image m has associated image data, which may include, for example, binary data or instructions to generate the image, e.g., printer command language (PCL) or postscript. In step 122, it is determined if the length of the image data, in bytes, is a multiple of four (due to the 32-bit word size of the NLFSR 26). If in step 122 it is determined that the length of the image data is not a multiple of four bytes, then in step 124 the image data size is increased to a multiple of four bytes by padding it with zeros. It should be understood that the size of the image data required will be dependent upon the word size of the NLFSR 26 and corresponding word size of the controller 22 (in this case, 32-bits, with 8 bits/byte resulting in a size that is a multiple of 4). If in step 122 it is determined that the length of the image data is a multiple of four, or after the image data size is increased to a multiple of four in step 124, then in step 126, the NLFSR 26 is clocked, i.e., each 32-bit word in each stage of the NLFSR 26 is shifted by one stage (such that $S_i = S_{i+1}$ and the value in $S_1$ is discarded), a portion of the session key k required to completely fill a stage (based on the word size of the stage, e.g., 32 bits) is combined with the current output y of the feed back function 52, using, for example, the exclusive-or (XOR) function (as illustrated in FIG. 2 where the INPUT DATA is the session key k), and the result stored in the first stage $S_n$ of the NLFSR 26. This clocking will preferably continue for the number of cycles required, using the updated current output y of the feedback function 52, until the complete session key k or some desired portion thereof has been utilized as the INPUT DATA. Thus, optionally in step 128 it is determined if there are still more bits of the session key k to utilize as INPUT DATA. If the answer in step 128 is yes, then in step 130 the next portion of the session key k required to completely fill a stage is obtained, and the NLFSR 26 is again clocked in step 126 as described above using the next portion of the session key k as the INPUT DATA.

Once the complete session key k or the portion thereof that will be utilized has been used as INPUT DATA, resulting in a no determination in step 128, then in step 132, the NLFSR 26 is again clocked by shifting the current contents of each stage by one stage, combining, e.g., XORing, a portion of the image data required to completely fill a stage with the current feed-back output of the feedback function 52 (as illustrated in FIG. 2 where the INPUT DATA is the portion of the image data), and storing the result of this combination in the first stage $S_n$ of the NLFSR 26. This clocking operation is repeated L/4 times, where L is the size of the image data in bytes (of the original image data if the original image data size was a multiple of four or the increased image data size if the original image data size was not a multiple of four) or some portion thereof that is desired to be secured. Thus, the clocking operation will preferably repeat such that all of the image data or some portion of the image desired to be secured will be utilized as the INPUT DATA. Thus, in step 134 it is determined if there are still more bits of the image data to utilize as INPUT DATA. If the answer in step 134 is yes, then in step 136 the next portion of the image data required to completely fill a stage is obtained, and the NLFSR 26 is again clocked in step 132 as described above using the next portion of the image data as INPUT DATA.

Once all of image data or the portion of image data desired to be secured has been used as INPUT DATA, resulting in a no determination in step 134, then in step 138 the NLFSR 26 is again clocked by shifting the current contents of each stage by one stage, combining, e.g., XORing, a portion of the session key k required to completely fill a stage (based on the word size of the stage, e.g., 32 bits) with the current output y of the feed back function 52, using, for example, the exclusive-or (XOR) function (as illustrated in FIG. 2 where the INPUT DATA is the session key k), and storing the result in the first stage $S_n$ of the NLFSR 26. This clocking will preferably continue for the number of cycles required, using the updated current output y of the feedback function 52, until the complete session key k or some desired portion thereof has again been utilized as the INPUT DATA. Thus, optionally in step 140 it is determined if there are still more bits of the session key k to utilize as INPUT DATA. If the answer in step 140 is yes, then in step 142 the next portion of the session key k required to completely fill a stage is obtained, and the NLFSR 26 is again clocked in step 138 as described above using the next portion of the session key k as the INPUT DATA.

Once the complete session key k or desired portion thereof has been used as INPUT DATA, resulting in a no determination in step 140, then in step 144 the current 192-bit state of the NLFSR 26 is output as the MAC of the image data for the image m. Optionally, to reduce the communication overhead, the size of the MAC can be truncated in step 144 to a smaller value, such as, for example, 128-bits or 80-bits. In step 146, the image data for the image m, along with the MAC generated for the image m, is sent from the accounting device 12 to the printer 14 via communication link 16. The image data for the image m need not be encrypted, as the security of the communication link 16 is provided by the MAC which is used to authenticate the image data (as described below). Because the data is not encrypted, troubleshooting of the communication link 16 in the event of an error is significantly easier as compared to troubleshooting when the data is encrypted.

Figure 5:
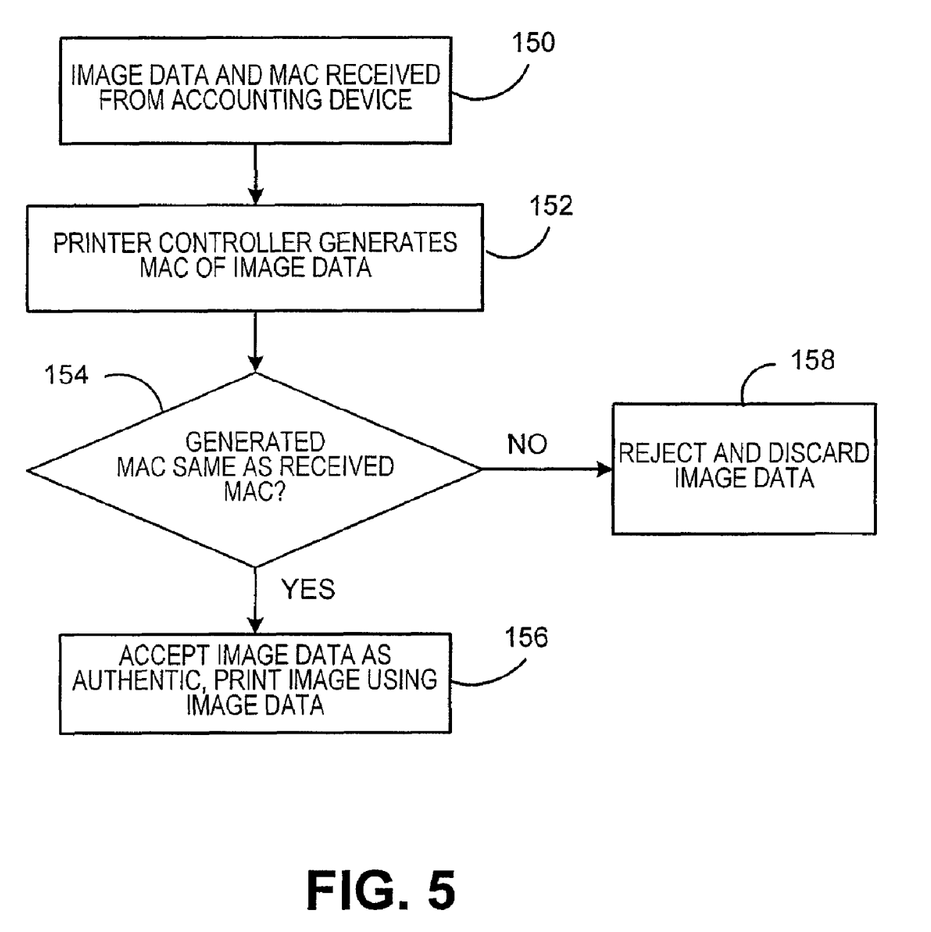
FIG. 5 illustrates in flow chart form another portion of the operation of the postage metering system of FIG. 1 according to an embodiment of the present invention.

Referring now to FIG. 5, there is illustrated in flow chart form the processing performed by the printer 14 when the image data and MAC sent from the accounting unit 12 (step 146 of FIG. 4) are received. In step 150, the image data and its associated MAC are received from the accounting unit 12. In step 152, the controller 40 of the printer 14 generates a MAC, using its NLFSR 26, in the same manner as described above with respect to steps 122-144 of FIG. 4 (the description of which need not be repeated here). In step 154, the controller 40 will verify the MAC by comparing the MAC generated by the controller 40 to the MAC received from the accounting device 12 to determine if they are the same. If in step 154 it is determined that the MAC generated by the controller 40 of the printer 14 is identical to the MAC received from the accounting device 12, then in step 156 the printer 14 will accept the image data as authentic and use the received image data to print the image m.

Upon commencing the printing operation for the image data, the printer 14 will preferably provide a signal to the accounting device 12 indicating acceptance of the image data. In response to receiving such a signal, the accounting device 12 will complete the accounting for the postage value associated with the image, e.g., update one or more registers maintained by the PSD 20. Thus, the accounting for the postage value will not be completed until the image data has been accepted for printing. If in step 154 it is determined that the MAC generated by the controller 40 of the printer 14 is not the same as the MAC received from the accounting device 12, then in step 158 the image data will not be accepted, as it has not been authenticated due to the failure of the MACs to correspond, and the image data will be discarded and no printing of the image data will occur. The controller 40 of the printer 14 can provide a communication back to the accounting device 12 indicating that the image data has been rejected. In response to receiving such a communication, the accounting device 12 will not complete the accounting for the postage value associated with the indicium, and thus the funds associated with the rejected indicium will not be lost. In addition, in response to receiving a rejected data message, the controller 22 of the accounting device 12 can initiate a new key agreement process to generate a new session key with the printer 14 and to re-initialize the NLFSRs 26. By stopping the printer 14 from printing any rejected image data, there is no wasted materials, e.g., ink, envelopes, labels or the like. In addition, by generating a new session key and re-initializing the NLFSRs 26 upon the rejection of image data by the printer 14, the postage metering system 10 will operate in a more efficient manner without wasting materials and funds.

In addition to the benefits described above in using the NLFSR based authentication system, the use of the NLFSRs according to the present invention provides greater security against possible attacks on the link between the accounting device 12 and printer 14. One such attack is a replay attack, where an attacker captures valid image data sent by the accounting device 12 and then replays the same image to the printer 14 at a later time. Since the MAC associated with the image data depends on the session key k as well as the current state of the NLFSRs, replaying image data at a later time will not pass the verification, as the state of the NLFSR will have already advanced. The MAC verification failure will result in a new session key being generated and a re-initialization of the NLFSRs. Another such attack is a forgery attack. Forging a valid image requires, however, at least knowledge of the session key. To obtain the session key, an attacker must either be able to guess the key or invert the non-linear feedback function, both of which are very difficult to do. Another type of attack is a modification of the image data as it is being transmitted from the accounting device to the printer. The non-linear transformation of the image data with the session key ensures that any modification to the image data will result in a random MAC being generated by the printer, thereby causing the MAC verification to fail. Another type of attack is to obtain the session key. The session key agreement protocol ensures that without knowledge of the master key MK, the only way to obtain the session key is to invert the MAC, which is very difficult to do. Since both the accounting device and printer contribute to the generation of the session key, this provides protection against replaying old sessions. The protocol also ensures that if a session key is somehow compromised, it will not help the attacker in computing future session keys.

It should be understood that although the present invention was described with respect to a postage metering system, the present invention is not so limited and is applicable to any type of value metering system or controlled printing environment. While a preferred embodiment of the invention has been described and illustrated above, it should be understood that this is exemplary of the invention and is not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for processing image data to be sent to a printer for printing, the method comprising:

Inputting a shared session key to a non-linear feedback shift register having a plurality of stages for storing data, each of the stages storing a portion of the session key, at least a portion of the plurality of stages providing the data currently stored therein to a feedback function to generate a current feedback output;

clocking the non-linear feedback shift register by shifting each stage of the non-linear feedback shift register by one stage, combining a portion of the session key with the current feedback output to produce a first result and storing the first result in a first stage of the non-linear feedback shift register;

clocking the non-linear feedback shift register by shifting each stage of the non-linear feedback shift register by one stage, combining a portion of the image data with the current feedback output to generate a second result, and storing the second result in the first stage of the non-linear feedback shift register;

repeating the clocking of the non-linear feedback shift register using a portion of the image data until all of the image data desired to be secured has been utilized;

clocking the non-linear feedback shift by shifting each stage of the non-linear feedback shift register by one stage, combining a portion of the session key with the current feedback output to generate a third result, and storing the third result in the first stage of the non-linear feedback shift register;

outputting at least a portion of the data currently stored in the non-linear feedback shift register as a message authentication code for the image data; and sending the image data and the message authentication code to the printer to perform a print operation using said image data based upon verification of said message authentication code.

2. The method of claim 1, wherein combining a portion of the session key with the current feedback output to produce a first result, combining a portion of the image data with the current feedback output to produce a second result, and combining a portion of the session key with the current feedback output to produce a third result further comprises:

using an exclusive-or function to combine the portion of session key with the first feedback output to produce the first result, the portion of the image data with the second feedback output to produce the second result, and the portion of the session key with the current feedback output to produce the third result.

3. The method of claim 1, wherein the image data includes binary data.

4. The method of claim 1, wherein the image data includes instructions for generating an image.

5. The method of claim 1, wherein before the session key is input to the register, the method further comprises:

generating the session key based on a serial number of the printer, first data generated by a device that generated the image data, second data generated by the printer, and a master key.

6. The method of claim 1, wherein outputting at least a portion of the data currently stored in the non-linear feedback shift register as the message authentication code for the image data further comprises:

truncating the at least a portion of the data currently stored in the non-linear feedback shift register; and outputting the truncated portion of the data currently stored in the non-linear feedback shift register as the message authentication code for the image data.

7. The method of claim 1, further comprising:

padding the image data to increase the image data to a predetermined size.

8. The method of claim 1, further comprising:

receiving at the printer the image data and the message authentication code for the image data;

generating, at the printer, a second message authentication code for the image data;

comparing the generated message authentication code with the received message authentication code;

performing a print operation to print an image using the image data when the generated message authentication code is identical to the received message authentication code; and not printing an image using the image data when the generated message authentication code is not identical to the received message authentication code.

9. The method of claim 1, wherein clocking the non-linear feedback shift register by shifting each stage of the non-linear feedback shift register by one stage, combining a portion of the session key with the current feedback output to produce a first result and storing the first result in a first stage of the non-linear feedback shift register further comprises:

repeating the clocking of the non-linear feedback shift register using a portion of the session key until all of the session key has been utilized.

10. The method of claim 1, wherein clocking the non-linear feedback shift by shifting each stage of the non-linear feedback shift register by one stage, combining a portion of the session key with the current feedback output to generate a third result, and storing the third result in the first stage of the non-linear feedback shift register further comprises:

repeating the clocking of the non-linear feedback shift register using a portion of the session key until all of the session key has been utilized.

11. A method for a printer to authenticate and print image data received from a metering device, the image data being received along with a message authentication code generated by the metering device for the image data using a shared session key, the method comprising:

inputting the session key to a non-linear feedback shift register having a plurality of stages for storing data, each of the stages storing a portion of the session key, at least a portion of the plurality of stages providing the data currently stored therein to a feedback function to generate a current feedback output;

clocking the non-linear feedback shift register by shifting each stage of the non\-linear feedback shift register by one stage, combining a portion of the session key with the current feedback output to produce a first result and storing the first result in a first stage of the non-linear feedback shift register;

clocking the non-linear feedback shift register by shifting each stage of the non\-linear feedback shift register by one stage, combining a portion of the image data with the current feedback output to generate a second result, and storing the second result in the first stage of the non-linear feedback shift register;

repeating the clocking of the non-linear feedback shift register using a portion of the image data until all of the image data desired to be secured has been utilized;

clocking the non-linear feedback shift by shifting each stage of the non-linear feedback shift register by one stage, combining a portion of the session key with the current feedback output to generate a third result, and storing the third result in the first stage of the non-linear feedback shift register;

outputting at least a portion of the data currently stored in the non-linear feedback shift register as a message authentication code for the image data comparing the generated message authentication code with the received message authentication code;

performing a print operation to print an image using the image data when the generated message authentication code is identical to the received message authentication code; and not printing an image using the image data when the generated message authentication code is not identical to the received message authentication code.

12. The method of claim 11, wherein combining a portion of the session key with the current feedback output to produce a first result, combining a portion of the image data with the current feedback output to produce a second result, and combining a portion of the session key with the current feedback output to produce a third result further comprises:

using an exclusive-or function to combine the portion of session key with the first feedback output to produce the first result, the portion of the image data with the second feedback output to produce the second result, and the portion of the session key with the current feedback output to produce the third result.

13. The method of claim 11, wherein the image data includes binary data.

14. The method of claim 11, wherein the image data includes instructions for generating an image.

15. The method of claim 11, wherein before the session key is based on a serial number of the printer, first data generated by the metering device, second data generated by the printer, and a master key.

16. The method of claim 11, wherein outputting at least a portion of the data currently stored in the non-linear feedback shift register as the message authentication code for the image data further comprises:
   truncating the at least a portion of the data currently stored in the non-linear feedback shift register; and
   outputting the truncated portion of the data currently stored in the non-linear feedback shift register as the message authentication code for the image data.

17. The method of claim 11, wherein clocking the non-linear feedback shift register by shifting each stage of the non-linear feedback shift register by one stage, combining a portion of the session key with the current feedback output to produce a first result and storing the first result in a first stage of the non-linear feedback shift register further comprises:
   repeating the clocking of the non-linear feedback shift register using a portion of the session key until all of the session key has been utilized.

18. The method of claim 11, wherein clocking the non-linear feedback shift by shifting each stage of the non-linear feedback shift register by one stage, combining a portion of the session key with the current feedback output to generate a third result, and storing the third result in the first stage of the non-linear feedback shift register further comprises:
   repeating the clocking of the non-linear feedback shift register using a portion of the session key until all of the session key has been utilized.

* * * * *